United States Patent

Schumacher et al.

[11] Patent Number: 5,573,040
[45] Date of Patent: Nov. 12, 1996

[54] INTERLOCKED PLASTIC-ENCASED CONCRETE PIPE

[75] Inventors: Mark W. Schumacher, Eagan; Raymond L. Sterling, Minneapolis, both of Minn.

[73] Assignee: Pipeform LLC, Mendota Heights, Minn.

[21] Appl. No.: 603,205

[22] Filed: Feb. 20, 1996

Related U.S. Application Data

[63] Continuation-in-part of Ser. No. 255,314, Jun. 7, 1994.
[51] Int. Cl.$^6$ ........................................................ F16L 9/14
[52] U.S. Cl. ........................... 138/147; 138/175; 138/144; 138/172
[58] Field of Search ............................. 138/97, 98, 140, 138/141, 144, 147, 149, 150, 172, 173, 174, 175, 176; 405/150.1, 211

[56] References Cited

U.S. PATENT DOCUMENTS

| | | |
|---|---|---|
| Re. 27,144 | 6/1971 | Rubenstein ........................ 138/174 |
| 928,233 | 7/1909 | Langford . |
| 1,252,012 | 1/1918 | Meier ................................. 138/147 |
| 1,513,723 | 10/1924 | Bohlander ......................... 138/147 |
| 1,549,406 | 8/1925 | De La Mare . |
| 1,673,637 | 6/1928 | Petersen ............................ 138/147 |
| 1,709,893 | 4/1929 | Bemis . |
| 1,969,374 | 8/1934 | Kleffel .............................. 138/149 |
| 2,086,525 | 7/1937 | Akers ................................ 138/147 |
| 2,243,427 | 5/1941 | Kleffel .............................. 138/149 |
| 2,719,348 | 10/1955 | Desnos . |
| 2,816,323 | 12/1957 | Munger ............................. 138/175 |
| 2,850,890 | 9/1958 | Rubenstein ........................ 138/176 |
| 3,177,902 | 4/1965 | Rubenstein ........................ 138/176 |
| 3,340,115 | 9/1967 | Rubenstein ........................ 138/176 |
| 3,352,116 | 11/1967 | Waterman . |
| 3,366,719 | 1/1968 | Lueders . |
| 3,482,007 | 12/1969 | Routh . |
| 3,520,749 | 7/1970 | Rubenstein ........................ 138/175 |
| 3,532,132 | 10/1970 | Rubenstein ........................ 138/172 |
| 3,706,615 | 12/1972 | Nishiyama et al. . |
| 3,742,985 | 7/1973 | Rubenstein ........................ 138/176 |
| 3,754,064 | 8/1973 | Snelling et al. . |
| 3,830,899 | 8/1974 | Piccioli et al. .................... 138/150 |
| 3,928,104 | 12/1975 | Luckett et al. . |
| 3,950,465 | 4/1976 | Farahar . |
| 3,955,600 | 5/1976 | Tamburello . |
| 4,110,991 | 9/1978 | Torkuhl . |
| 4,184,517 | 1/1980 | Corey . |
| 4,209,043 | 6/1980 | Menzel . |
| 4,308,082 | 12/1981 | Menzel . |
| 4,337,564 | 7/1982 | Menzel et al. . |
| 4,419,305 | 12/1983 | Matles . |
| 4,435,460 | 3/1984 | Menzel . |
| 4,566,496 | 1/1986 | Menzel et al. . |
| 4,616,495 | 10/1986 | Menzel . |
| 4,687,690 | 8/1987 | Menzel . |
| 4,754,781 | 7/1988 | Jan de Putter ..................... 138/173 |
| 4,921,018 | 5/1990 | Dridi et al. ....................... 138/149 |
| 4,929,294 | 5/1990 | Blome . |
| 4,977,931 | 12/1990 | Menzel . |
| 4,995,929 | 2/1991 | Menzel . |
| 5,028,368 | 7/1991 | Grau . |
| 5,032,197 | 7/1991 | Trimble . |
| 5,074,943 | 12/1991 | Menzel . |
| 5,186,987 | 2/1993 | Imoto et al. . |
| 5,190,705 | 3/1993 | Corazza . |
| 5,271,974 | 12/1993 | Upchurch . |

FOREIGN PATENT DOCUMENTS

| | | | |
|---|---|---|---|
| 2317041 | 10/1974 | Germany ........................... 138/175 |
| 62-32873 | 8/1987 | Japan ................................. 405/211 |
| 520659 | 4/1940 | United Kingdom ............... 138/175 |

*Primary Examiner*—Patrick Brinson
*Attorney, Agent, or Firm*—Vidas, Arrett & Steinkraus

[57] ABSTRACT

A composite concrete pipe in which both the inner and outer surfaces are plastic. The pipe may be formed of any diameter by forming the inner and outer plastic surfaces from helically wrapped interlocking plastic strips to form the diameters desired.

3 Claims, 5 Drawing Sheets

INTERLOCKED PLASTIC-ENCASED CONCRETE PIPE

This application is a FWC application from Ser. No. 08/255,314 filed Jun. 7, 1994.

BACKGROUND OF THE INVENTION

1. Field of the Invention

This invention relates to a concrete and plastic composite pipe in which the inner and outer walls are lined with plastic.

2. Description of the Related Art

The current state of the art in the concrete pipe industry involves casting by the packerhead process, the vibration process or the spin process. Commonly, within the wall of the pipe steel cages would be suspended for reinforcement. The packerhead uses a spinning head that moves up through the pipe to, (1) disperse the concrete dropped in from the top out to the outside form, (2) provide the consolidation of the concrete within the wall of the pipe by means of pressure, and (3) upon completion of one or more passes up and down through the pipe form the inside diameter. The vibration process utilizes fixed inside and outside forms and the steel reinforcement is dropped into the annular space between the forms. The concrete is then introduced into the annular space by gravity and subjected to intense high frequency vibration to achieve the compaction and consolidation required. The spinning process uses a horizontal spinning mold with end caps into which the concrete is introduced and consolidation is achieved through centrifugal force.

The finished pipes (in all processes) are then moved to a curing area and stripped of the forms. The forms are then returned to the production station and the process is repeated. Since the finished pipe is stripped of all supporting form work immediately after casting, the concrete mixes used in these processes must be very dry, stiff mixes exhibiting zero or negative slump. Slump measurement involves using a tapered steel cone filled with the concrete mix then the cone is turned over so the larger radius end of the cone sets on the floor and the smaller radius end is up. The cone is removed and the amount of slump or settling of the concrete is measured relative to the top of the cone. Zero slump refers then to a condition where no settlement takes place. Negative slump refers to a concrete mix where water could be added and still have a zero slump result in the test. Since the pipes must stand unsupported right away, the mixes used in this process have little flexibility and sometimes the pipes exhibit inconsistently or poorly consolidated material. In addition the pipes need to be cured in a moist environment, commonly steam cured, to allow the finished pipes to take on enough moisture to fully hydrate the cement in the mix so that the full strength of the concrete can be achieved. The limitations of the very dry mix inhibit the industry from taking advantage of the many possible mix designs to achieve better consolidation and higher strengths. In addition, the exposed concrete can change shape slightly and lose its dimensional tolerances through the drying process.

The other limiting feature of the processes described above is the need for fixed equipment for every size and wall thickness of pipe produced. This equipment is costly and must be produced for a very demanding environment where it is subjected to intense compaction pressures and vibration levels, as well as the abrasive nature of the dry concrete mix.

The pipes produced by this process have several problems or limitations. To achieve the required three edge bearing strengths for underground burial and to minimize the amount of steel required, the walls are relatively thick, making the pipes heavy and more difficult to handle and limiting the distance they can be economically transported. The first mode of failure in the three edge bearing test is the 0.01 inch (0.25 mm) crack that typically occurs in either the crown or invert of the pipe. While this is not structural failure, (it indicates the passing of all tensile stresses to the steel reinforcement) it is the common design parameter since most users do not want a crack such as this to allow water or other corrosive materials to corrode the reinforcing steel.

This leads to the main limitation in use of concrete pipes for sanitary sewers. In many areas of the country hydrogen sulfide corrosion of sanitary sewers is a severe problem. The alkaline nature of the cement paste in concrete is particularly susceptible to attack from the sulfuric acid formed from generation of hydrogen sulfide in sanitary sewers. Hydrogen sulfide is the noxious and lethal gas with the "rotten egg" odor that results from the biological breakdown of human and animal waste. To combat this problem, liners of highly plasticized PVC were created to be cast into the inside diameter of concrete pipes. These liners were designed to provide corrosion protection only, they had no rigidity and offered no structural enhancement at all. These liners were successful in providing corrosion protection; however, they had other problems. Their extremely flexible nature made them difficult to handle in the pipe manufacturers plant and temperature differences were important since these liners had to be placed around the fixed diameter inside forms. These liners had a very high coefficient of thermal expansion relative to the steel forms so depending on the ambient temperature they could either fit too tightly or loosely. The other problem was that to protect the joint area between pipe sections a strip of the PVC material several inches wide had to be welded by hand into the liner on adjacent pipe sections in the pipeline after installation in the field. The result of the production problems and the field welding made this system expensive and limited the size range to those accessible to man entry.

There have been several attempts to use fiberglass as an inside and outside "lining" for concrete pipe. These products were associated with the spin manufacturing process previously described. No manufacturer in this country is currently using this composite process, one manufacturer does have the capability to centrifugal cast. The limiting factor for this manufacturing process has been that it is very slow and costly.

In the plastic pipe industry there have been some composite product offerings, the closest to the invention being described here is a product called Truss Pipe. This is a pipe with a thin outer and inner shell connected by thin webs in a truss configuration angling between the inside and outside layers. This part of the pipe is created with a straight extrusion where the webs run longitudinally with the pipe barrel and the process requires a different die for each size. The annular space between the webs is filled with a lightweight cellular concrete grout for rigidity. This composite pipe behaves as a flexible pipe, that is it deflects progressively and significantly under a load. The lightweight concrete performs as a filler to provide some rigidity to increase the pipe's stiffness and keep the plastic members in their optimal location. Other composite plastic products include plastic foam core, lining of metal pipes or tubes, and fiberglass and resin mortar pipes.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

SUMMARY OF THE INVENTION

The invention provides concrete pipe of whatever diameter and thickness desired as a composite with a plastic inner and outer layer. The plastic layers create a rigid pipe with advantages over concrete alone. The pipe is defined by spirally wound ribbed plastic profiles that interlock to form the inner and outer walls of the eventual pipe. The annular space between is filled with concrete and vibrated to fill any voids.

BRIEF DESCRIPTION OF THE DRAWINGS

A detailed description of the invention is hereafter described with specific reference being made to the drawings in which.

DESCRIPTION OF THE PREFERRED EMBODIMENTS

With reference to FIGS. 1–7, the invention described here is a rigid composite walled pipe 10 that utilizes both plastic elements 12, 14 and concrete 16 in a design that leverages the best structural aspects of each material. The design offers better structural performance, reduced weight over existing concrete pipes, corrosion protection, and elimination of leakage from external hydro static forces. Due to the way in which the plastic and concrete elements are used, the manufacturing process is significantly changed from the existing processes in either concrete or plastic pipe production, resulting in elimination of fixed equipment for each size of pipe, steel reinforcement use, and need for special curing chambers. The unique features of the pipe 10 itself and the production process will be described below.

PIPE

The pipe 10 is formed using tubes 12, 14 made from a spirally wound ribbed plastic profile for both the inside and outside diameter, with the ribs 20 extending into the annular space of the pipe. This plastic profile is rigid, i.e. the tubes 12, 14 formed make a freestanding pipe in and of themselves. The annular space is filled with concrete 16, vibrated to provide consolidation and complete filling of the spaces in and around the ribs 20. This locks the plastic 12, 14 and concrete 16 together allowing structural interaction between the two materials. The design places the plastic 12, 14 at the inner and outer extremities of the structure, the points where tensile stresses in the three edge bearing or crush tests are highest. This allows the plastic, which has far superior tensile strength compared to concrete, to carry the tensile forces. The concrete, which has a superior modulus of elasticity and compressive strength, provides the rigidity and carries the compressive stresses. The interaction of the two materials produces superior structural performance without the need for internal steel reinforcement to carry tensile loads. Table 1 below compares the results of three edge bearing tests on the composite pipe and compares with requirements for both reinforced and unreinforced pipes for various wall thicknesses. The testing was conducted by Twin City Testing of St. Paul, Minn.

| UNREINFORCED CONCRETE PIPE | | | | |
| --- | --- | --- | --- | --- |
| Pipe Dia. in. | Pipe Class | Wall Thickness in. | Pipe Wt. lb/ft | Req. 3-edge Bearing Str. lb/lin ft |
| 12 | 2 | 1.375 | 58 | 2250 |
| 12 | 3 | 1.75 | 76 | 2600 |

| REINFORCED CONCRETE PIPE | | | | | |
| --- | --- | --- | --- | --- | --- |
| Pipe Dia. in | Pipe Class | Wall Thickness in. | Pipe Wt. lb/ft | Req. 0.01" 3-Edge Bearing str. lb/lin ft | Req. Ult. 3-Edge Bearing Str. lb/lin ft |
| 12 | 5 | 2 | 92 | 3000 | 3750 |
| 12 | 5 | 2.75 | 147 | 3000 | 3750 |

| CONCRETE & PLASTIC COMPOSITE PIPE | | | | | |
| --- | --- | --- | --- | --- | --- |
| Pipe Size in. | Pipe Class | Wall Thickness in. | Pipe Wt. lbs/lin. ft | 0.01" 3-Edge Bearing Str. lb/lin ft | Ult. 3-Edge Bearing Str. lb/lin ft |
| 12 | | 1.39 | 54 | 3914 | 5712 |
| 12 | | 2.50 | 116 | 6501 | 11059 |

The values for required three edge bearing strength are taken from ASTM C-14 for unreinforced concrete pipe and ASTM C-76 for reinforced concrete pipe. Unreinforced pipe does not have an ultimate three edge strength value since it fails structurally once a significant crack forms. The required values for reinforced pipe are the same no matter what wall thickness is used, the change is in the steel required to reinforce the pipe. Thinner walled pipes require more steel reinforcement to achieve the same three edge bearing test results. By analyzing the tables it can be seen that the composite pipe achieves more than double the performance in the strength test on a comparable wall thickness basis as compared with the conventional steel reinforced concrete pipe. In addition, after the 0.01 inch (0.25 mm) crack occurs, the composite walled pipe begins to behave closer to a flexible pipe, i.e., under increasing load the pipe deflects significantly without structural damage to the plastic inside and outside tubes. The inside and outside tubes also bridge cracks, so they are not exposed to corrosive materials.

The plastic inside diameter addresses the corrosion issues previously mentioned and since the type of plastic used in the strip can be varied, the pipes can provide corrosion protection in some industrial applications where waste streams can vary widely in temperature and chemical makeup from typical municipal waste streams.

PRODUCTION PROCESS

The unique features of the production process are characterized by the flexibility and infinite variability achieved by eliminating fixed equipment. This flexibility begins with the winding machine that produces the plastic tubes. The machine is infinitely variable within the size range the producer desires to construct a machine. This winding machine is protected by patents previously issued to Mr. Stanley Menzel of Australia. Helically wound plastic pipe formation is described in U.S. Pat. Nos. 5,074,943, 4,995, 929; 4,977,931; 4,687,690; 4,616,495; 4,566,496; 4,435, 460; 4,337,564; 4,308,082 and 4,209,043, the disclosures of which are incorporated herein.

The process here involves winding one tube 14 with the ribs 20 pointing out to form the inside diameter, and one tube 12 inside out, so to speak, with the ribs 20 pointing in for the outside diameter. It is this concept of using an "inside out"tube combined with the inside diameter tube to build a concrete pipe 10 that will eliminate the fixed form for every size requirement that is one of the key features of the process invention. Since the "form" becomes part of the pipe 10, it allows the process to be very flexible in use of different mix designs to impart certain structural properties, aid in placement of the concrete in the form, insure adequate moisture to fully hydrate the cement, and allow the pipe to maintain its dimensional tolerances while curing. A second key element of the process invention is that with the form becoming part of the pipe and the resulting flexibility in the characteristics of the core material will allow different techniques to be used to introduce the core material. In the prototypes referenced above concrete 16 was the core material and the annular spaces between the tubes 12, 14 was sufficient to allow introduction of the concrete in a conventional gravity feed "dumping" manner. As the annular space changes and as the need for different materials in the core arises, other methods of filling can be used such as vacuum, pumping, injection, or some combination thereof. Finally, containing the concrete in the structural "form" eliminates concerns regarding the concrete drying out too quickly and thus eliminates the need for special curing rooms.

It is anticipated that production of the pipe 10 would best proceed as follows. The desired pipe size is determined and an outer plastic layer 12 is formed at a robe forming station using a helical pipe winding machine as patented by Mr. Menzel, referred to above. The inner robe 14 is formed at a similar station of a diameter required for the internal dimension of the finished pipe 10. Note that the robes 12, 14 have ribs 20 to contact and bind to the concrete. The robes 12, 14 are wound such that the ribs 20 face the concrete.

With reference to FIGS. 8–11, the inner and outer plastic tubes 12, 14 are then moved to a casting station 30 which preferably is located below floor grade 32 such that an operator 34 may readily observe the filling of the annulus 36 between the tubes 12, 14. Station 30 includes a central fixed post 40 and spaced peripheral posts 42. A casting pallet 56 having a central hole 58 such that it may pass over the central post 40 is positioned on top of a vibrating machine 60. includes a plurality of adjustable guides 44 which may be moved out from said post to define and increase the diameter of the inside of the pipe 10 to be formed. Guides 44 would preferably include arcuate members 46 which closely match the inner plastic tube 14. A tube 14 is placed over the post 40 and the guides 44 are moved out to contact and hold the tube 14 in position.

The outer, peripheral posts 42 include a similar adjustable guide 50 with arcuate members 52 to hold captive the outer plastic tube 12. Again, it is desirable if the arcuate members 52 define most of the circumference of the tube 12 such that the tube is kept from moving during concrete loading. It may be desirable to add vacuum to the arcuate members 46, 52 such that the plastic of the tubes 12, 14 is held to the arcuate members rather than simple abutment.

Figures 1, 2, 3:
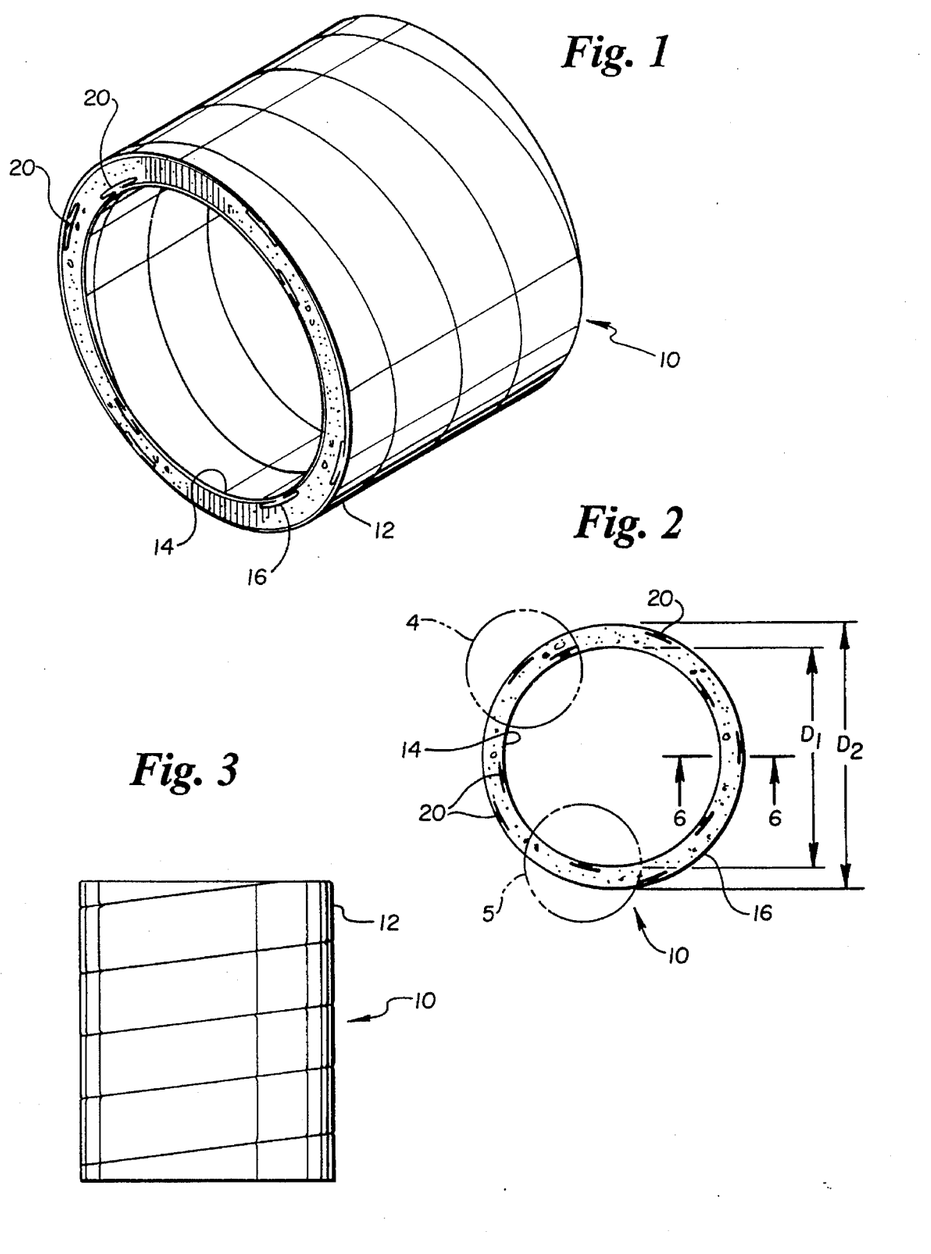
FIG. 1 is a perspective view of the composite plastic-lined concrete pipe of the invention.
FIG. 2 is an end view of the pipe of FIG. 1.
FIG. 3 is a side elevational view of the pipe of FIG. 1 showing the helically wound exterior plastic layer.
Figures 4, 5, 6, 7:
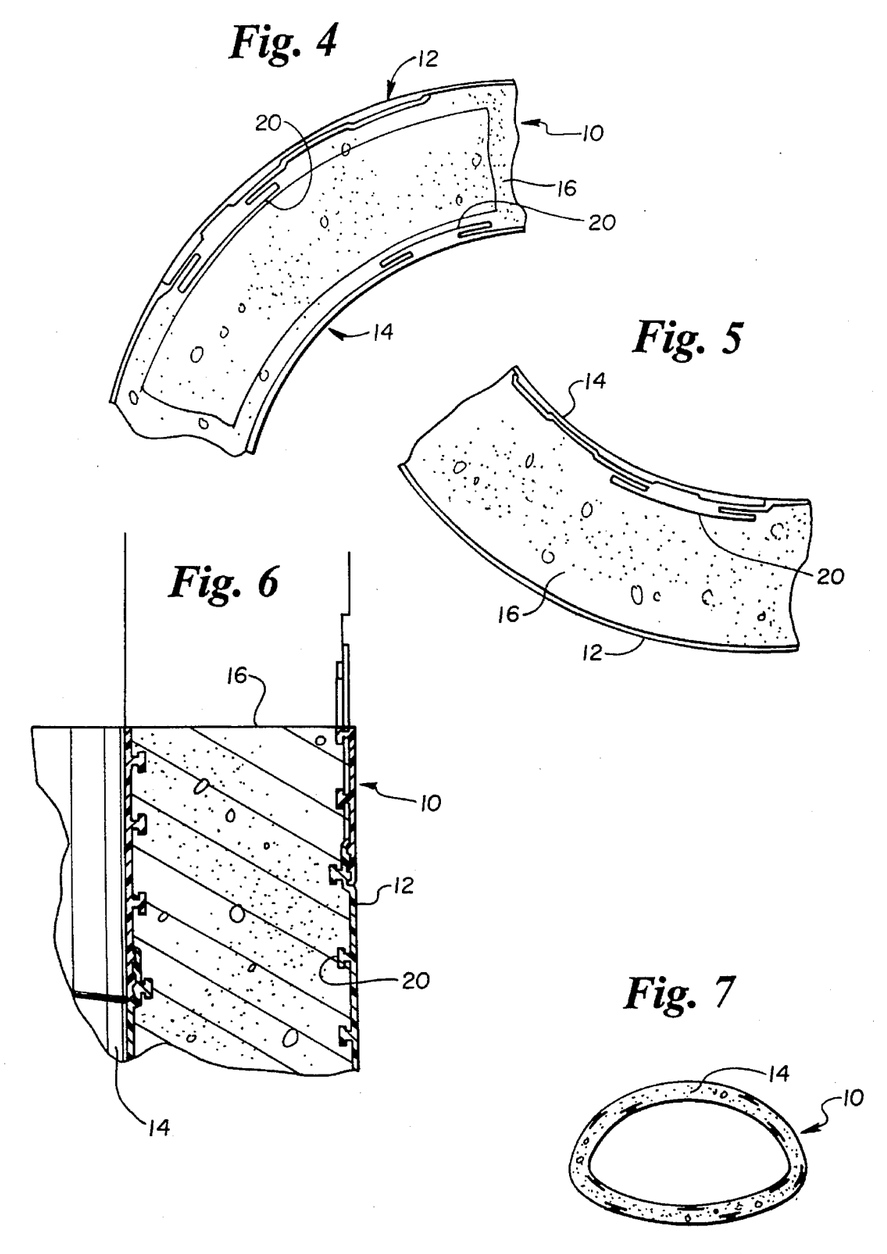
FIG. 4 is an enlarged blow-up from FIG. 2 showing the interlock of inner and outer plastic layer wraps with concrete.
FIG. 5 is an enlarged blow-up from FIG. 2 showing the ribs which lock into the concrete.
FIG. 6 is a cross-sectional view through lines 6—6 of FIG. 2.
FIG. 7 is a end view of a pipe showing that the pipe may be off-round.
Figure 8:
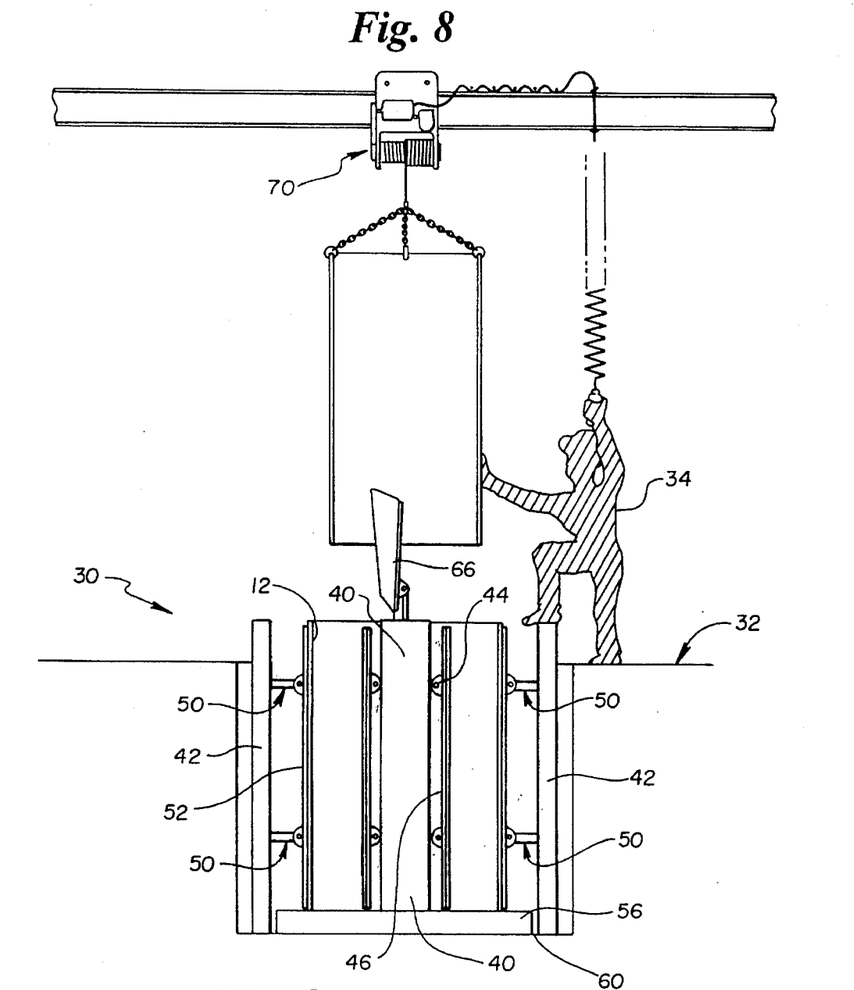
FIG. 8 is a simplified mechanical diagram of a pipe forming machine.
Figure 9:
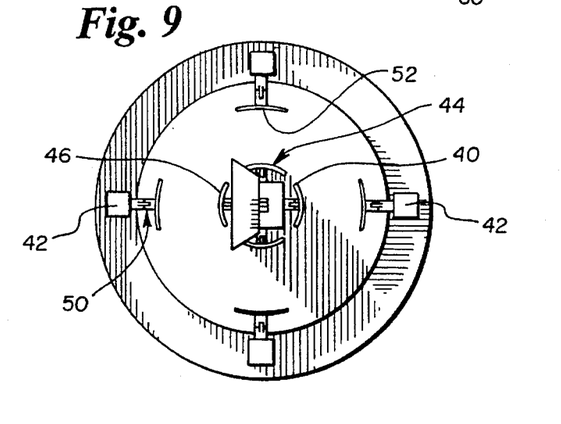
FIG. 9 is a top plan view of the machine of FIG. 8.
Figure 10:
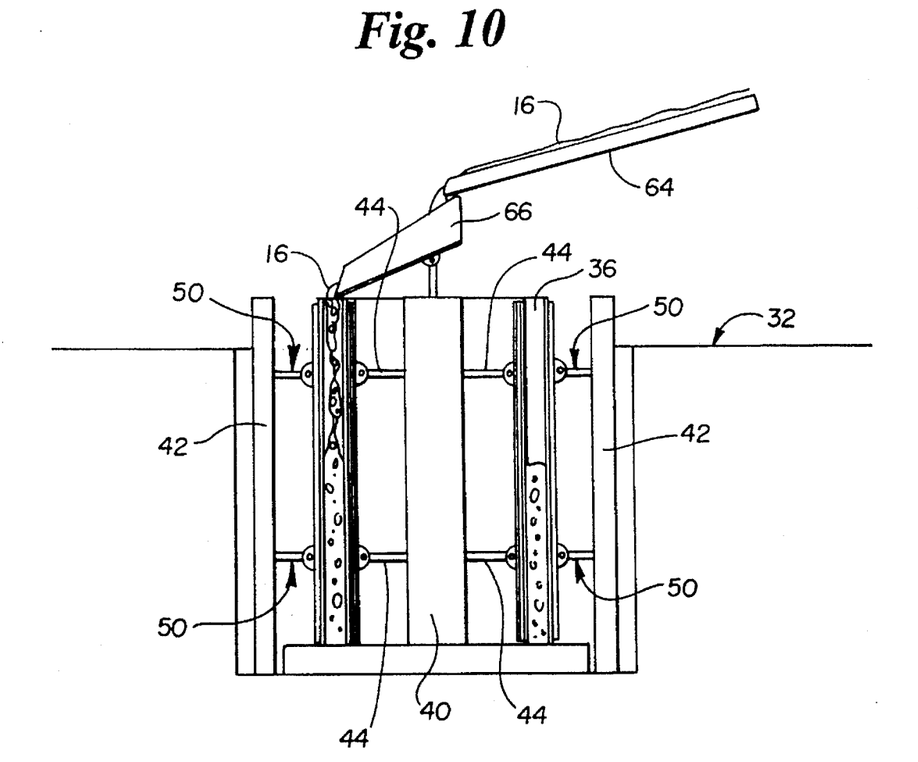
FIG. 10 is a simplified mechanical diagram of the machine of FIG. 8 showing concrete loading.
Figure 11:
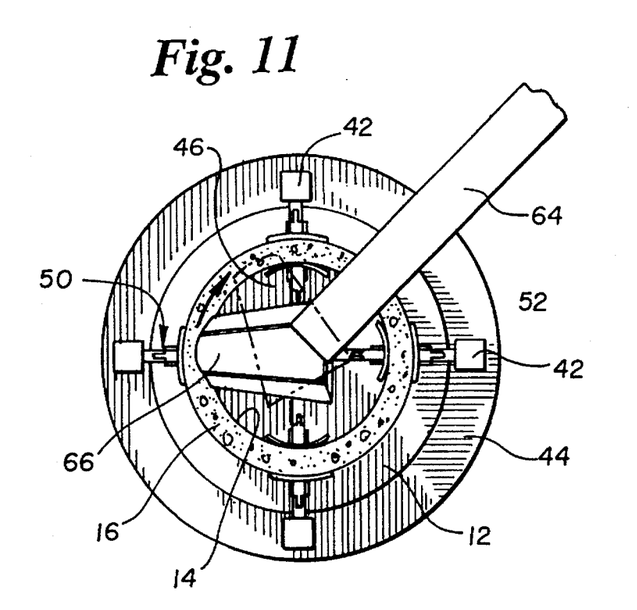
FIG. 11 is a top plan view of the machine of FIG. 9 showing concrete loading.

FIGS. 8–11 shows a concrete feed conveyor 64 which transfers mixed concrete 16 to a rotating distributor 66 which may be mounted to central post 40. As best shown in FIG. 11, the distributor 66 rotates allowing concrete to be evenly distributed into the annulus 36 to form the concrete or the pipe 10. Vibration as needed may be supplied by the underlying vibrator 60.

Generally, the concrete 16 itself may be mixed by a high shear, high revolution mixer, a conventional ribbon mixer or pan mixer as used in precast concrete plants, carried to a holding hopper and dropped to conveyor 64 where it may be directed into the annulus 36 as described.

After the concrete fills the annulus 36, the pipe 10 is essentially formed. A lifting crane 70 may be moved over the pipe 10 thus formed, attached to lifting lugs 72 on the casting pallet 60 and used to lift the formed pipe 10 to a curing station. The next pipe to be formed is then made by repeating the process. Simple adjustment of the guides 44, 50 changes the diameter of the pipe to be formed, when used in conjunction with different sized tubes 12, 14. The process of using the tubes 12, 14 for the forms makes it very easy to custom make whatever size pipe is desired. Thickness of concrete is set by the selection of the tube 12, 14 sizes and adjustment of the guides 44, 50.

Figure 13:
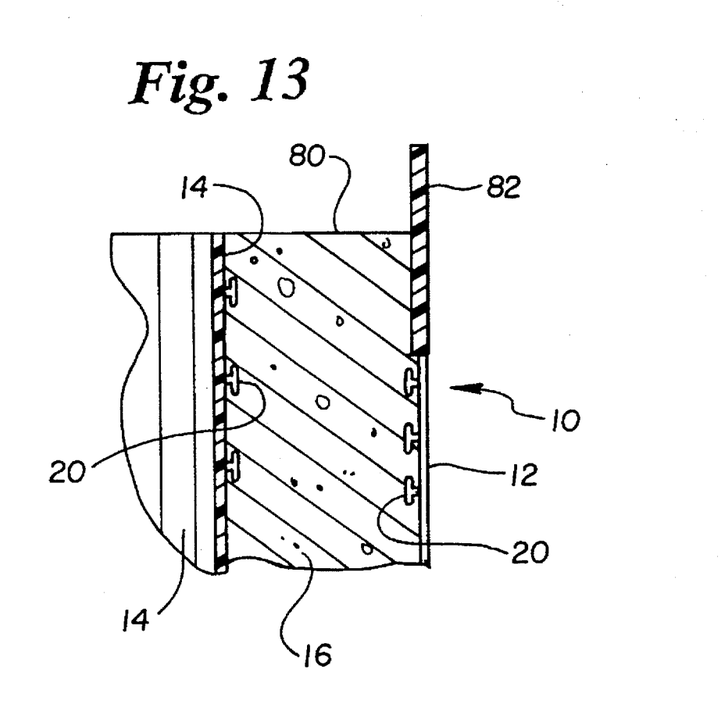
FIG. 13 shows an end treatment of composite pipe.

After being formed, the pipes 10 may require finishing depending on their intended uses. If the pipe is to be used in microtunneling, the ends 82 may be ground flat to avoid point loading during jacking. The ends 82 may be coated with concrete epoxies, polyester resin or covered with a plastic welded to the inner and outer tubes 12, 14 if a seal is desired.

The ends 82 of the pipe 10 may also be treated to prepare joints between adjacent pipes. Typically, the outer edges of the pipe ends 82 may be ground back about 3 inches (7.6 cm) to remove the plastic tube 12 and some concrete 16, typically to the depth of the ribs 20. A collar 82 of steel, stainless steel or plastic may then slide over this ground section such that it extends past the ends 80 and can be used to join over another pipe with its end ground back.

Although the drawings show a completely lined composite pipe, it is possible to remove the inner, outer or both plastic layers 12, 14 such that the pipe formed may be fully lined, lined on one surface or unlined. The benefit is that custom sized pipes may be formed by using the tubes 12, 14 as forms, whether they remain incorporated in the final pipe or not. Obviously, if a tube 12 or 14 is not to be part of the final pipe, it would not include projecting ribs 20 to contact concrete. The outer tube 12 may be removed simply by heating to expand and pop free, or release agents may be used to decrease adherence.

In addition, although formation of tubes 12, 14 is expected to be via a helical wrap such as in the Menzel patents described, any preformed plastic tubes may be used. Spiral wrapped plastic tubes are not required, they simply make the process of forming custom pipes easier since no stock of preformed plastic tubes need to be ordered.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A composite pipe comprising:
   (a) a concrete core pipe having an inner and an outer surface;
   (b) an outer layer of plastic spirally wound about and mechanically locked into said concrete core outer surface via a plurality of ribs in said outer plastic layer, said ribs being arranged such that the ribs run across the longitudinal axis of the pipe; and
   (c) an inner layer of plastic spirally wound about and mechanically locked into said concrete core inner surface via a plurality of ribs in said inner plastic layer, said ribs being arranged such that the ribs run across the longitudinal axis of the pipe, said inner layer of plastic having interlocking, sealed edges.

2. The pipe of claim 1 wherein said outer layer of plastic has interlocking, sealed edges such that said outer layer provides corrosion protection to the composite pipe.

3. An interlocked plastic-lined pipe comprising:
   (a) a concrete core pipe having an inner and an outer surface;
   (b) an elongated outer plastic strip spirally wound about and mechanically locked into said concrete core outer surface via ribs that run across the longitudinal axis of said pipe, said spirally wound outer plastic strip having interlocking longitudinal edge portions locked together, said plurality of ribs project into said concrete prior to cure; and
   (c) an elongated inner plastic strip spirally wound about and mechanically locked into said concrete core inner surface via ribs that run across the longitudinal axis of said pipe, said spirally wound inner plastic strip having interlocking longitudinal edge portions locked together, said plurality of ribs project into said concrete prior to cure.

* * * * *

UNITED STATES PATENT AND TRADEMARK OFFICE
CERTIFICATE OF CORRECTION

PATENT NO. : 5,573,040

DATED : Nov. 12, 1996

INVENTOR(S) : Mark W. Schumacher et al

Figure 12:
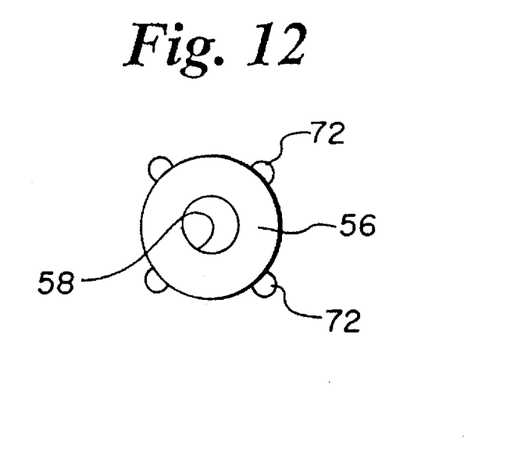
FIG. 12 shows a casting pallet.

It is certified that error appears in the above-indentified patent and that said Letters Patent is hereby corrected as shown below:

Col. 5, line 57, delete "robe" and insert -- tube --;

Col. 5, line 59, delete "robe" and insert -- tube --;

Col. 5, line 61, delete "robes" and insert -- tubes --;

Col. 5, line 62, delete "robes" and insert -- tubes --;

Col. 6, line 5, after "60." insert -- The pallet 56 as shown in Fig. 12 may be steel and defines the lower end of the pipe to be cast. Central post 40"

Col. 6, line 25, delete "or" and insert -- of --;

Signed and Sealed this

Seventeenth Day of June, 1997

Attest:

Attesting Officer

BRUCE LEHMAN

Commissioner of Patents and Trademarks